United States Patent [19]

Pommerenke et al.

[11] Patent Number: 5,663,739

[45] Date of Patent: Sep. 2, 1997

[54] METHOD AND ARRANGEMENT FOR ESTABLISHING NETWORKS OF ELECTRO-OPTICAL DISPLAY-FIELD MODULES

[75] Inventors: Martin Pommerenke; Hartmuth Siefker, both of Berlin, Germany

[73] Assignee: M A N Systemelektronik GmbH, Karlsfeld, Germany

[21] Appl. No.: 364,805

[22] Filed: Dec. 27, 1994

Related U.S. Application Data

[63] Continuation of Ser. No. 159,373, Nov. 30, 1993, abandoned.

[30] Foreign Application Priority Data

Dec. 28, 1992 [DE] Germany ............ 42 44 584.1

[51] Int. Cl.⁶ ............................................. G09G 5/00
[52] U.S. Cl. ............................. 345/1; 345/2; 345/214
[58] Field of Search ................................ 345/1, 2, 207, 345/206, 214, 903

[56] References Cited

U.S. PATENT DOCUMENTS

| | | | |
|---|---|---|---|
| 4,833,542 | 5/1989 | Hara et al. | 345/903 |
| 4,851,616 | 7/1989 | Wales et al. | 345/207 |
| 4,949,079 | 8/1990 | Loebner | 345/207 |
| 5,132,828 | 7/1992 | Conner et al. | 359/173 |
| 5,307,297 | 4/1994 | Iguchi et al. | 345/169 |

FOREIGN PATENT DOCUMENTS

| | | | |
|---|---|---|---|
| 4141387 | 5/1992 | Germany. | |
| 4145435 | 11/1979 | Japan | 345/1 |

*Primary Examiner*—Richard Hjerpe
*Assistant Examiner*—Vui T. Tran
*Attorney, Agent, or Firm*—McGlew and Tuttle

[57] ABSTRACT

A method and arrangement for establishing networks of electro-optical display-field modules. Mechanical connection technology is provided for the network by direct or indirect coupling of the transmission and reception devices provided in the individual display-field modules. The transmission of information is performed over an optical bus system established by the transmission and reception devices of adjacent display-field modules.

18 Claims, 3 Drawing Sheets

METHOD AND ARRANGEMENT FOR ESTABLISHING NETWORKS OF ELECTRO-OPTICAL DISPLAY-FIELD MODULES

This application is a continuation of application Ser. No. 08/159,373 filed on Nov. 30, 1993, now abandoned.

FIELD OF THE INVENTION

The invention relates to a method and an arrangement for establishing networks of electro-optical display-field modules.

BACKGROUND OF THE INVENTION

An electro-optical display field is built up from many identical modules. Each module includes drivers for the electro-optical display technique and decoders for information processing. The information to be displayed is transmitted by means of physical leads. For establishing a network of such display-field modules, cables and plug connectors are commonly used. This causes the disadvantage that with large display fields, substantial mechanical connection technology is required for transmitting the information to be displayed, namely cables and plug connectors. In each module there is incorporated a device for connecting the information lines. Such mechanical connection technology is relatively complex and makes the manufacture of electro-optical display fields expensive. Furthermore, the commonly employed mechanical connection technology, consisting of copper cables and mechanical plug connectors, is subject to interferences and is not protected from electromagnetic radiation and irradiation.

In the field of computer systems, a different field from the field of the subject matter of the invention it is known from DE 40 06 510 A1 to employ an optical bus system, for the rapid transmission of data between the various components of the system connected to common connection lines (bus). The optical bus system has an optically parallel disk pack or an optically parallel strip circuit board, resp. The optical bus described in DE 40 06 510 A1 can be used as a serial as well as a parallel bus. The application of such an optical bus has been with digital circuits. Such digital circuits are commonly connected with each other by means of a digital-electronic bus.

In DE 41 41 387 A1, a data transmission interface for a one-digit data bus, preferably for automobiles, is described. This data bus includes an electro-optical data transmission path with at least one data transmitter and one data receiver. For grouping the signals and shielding against external light, the internal areas of hollow bodies are used. Within the hollow body, the optical signals are distributed over a plurality of reflections into all areas. These data connections are relatively slow, and cannot directly be applied to other applications.

In DE 40 17 997, an optical data transmission system is disclosed (a different field from the field of the subject matter of the invention). Users of the system are arranged in a line, each with at least one optical transmitter and receiver. The users are connected over the transmission paths formed of hollow spaces to an adjacent user. The users located at the ends of the line are also connected with the respectively adjacent user, over optical transmission paths. The intended application for automated devices cannot easily be applied for establishing networks of display-field modules.

SUMMARY AND OBJECTS OF THE INVENTION

It is therefore the object of the invention to develop a method and an arrangement for establishing networks of display-field modules, whereby the application of mechanical connection technology is prevented.

According to the invention, a method is provided for establishing networks of electro-optical display-field modules of a display field. The method includes equipping each display-field module with its own optical transmission and reception device. The transmission device emits optical radiation from an associated display field module without a physical lead and a reception device of an adjacent display field module receives the optical radiation without a physical lead and an optical bus system is established by via transmission and reception connections between adjacent display field modules.

The invention further provides an arrangement for carrying out the method including a plurality of display field modules disposed in lines and columns. Each display field module includes an optical transmission device and an optical reception device. The reception device of each display field module is disposed for receiving optical radiation of an adjacent transmission device without a physical lead connection wherein a plurality of adjacent display field modules with transmission and reception devices form an optical bus system.

The optical bus system may be formed between a series of adjacent display field modules are in a line wherein the display field modules arranged in lines and columns and each line is connected to a line coupling-in device for coupling in data into the display field modules of one line (a branch of an optical bus). The line coupling-in devices are in turn optically connected with another coupling-in device or with a device for feeding in data. The optical bus may also be provided with reception devices and transmission devices connects optically via a reflection field. The reflection field connect a transmission device of a first display field module with a reception device of a second display field module (over the reflection field) and in turn the transmission device of the second display field module can be connected to a reception device of a third display field module.

The direct or indirect coupling of the transmission and reception devices of the individual display-field modules permits the replacement of the mechanical connection technology by the optical connection technology. Assembly and maintenance of the display-field is less since no cables or mechanical line connectors are required. The modules can be exchanged, without cables or line connectors having to be loosened. For transmission of information, no lines, not even light waveguides, are required. Since in total, long data lines are not required, radiation is prevented and irradiation of high-frequency signal portions from or into the display-field modules, resp., is reduced. By optically coupling the display-field modules, high transmission rates are possible in the display-field system. The suggested display-field module networks are independent from the type of display field-modules or the manner in which the display-field modules operate to display a picture.

The method of the invention includes the embodiments of direct reception of transmissions from an adjacent display field module without a physical lead or over a non-solid medium or an indirect connection between transmission and reception devices of adjacent display field modules via a reflection, again over a non-solid medium. Further, the method also contemplates an embodiment having the reception devices and transmission devices of display field modules being directed over a light conducting fiber.

The arrangement according to the invention further includes plural rows or lines of display field modules with reception devices and transmission devices of adjacent display field modules connected and with each row being connected to a line coupling-in device. Adjacent line coupling-in devices are preferably also connected with a first or primary line coupling-in device being connected to a device for feeding data in. In an alternate arrangement, the device for feeding data in has a transmission device optically connected to the reflection field with a reception device of a first display field module being connected to the transmission device of the device for feeding data in with subsequent adjacent modules being connected with reception devices and connection device connected over the reflection field. Further, the optical transmission and reception devices preferably are formed by one or more transmission or reception semiconductors such as one or more semiconductor diodes.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1A:
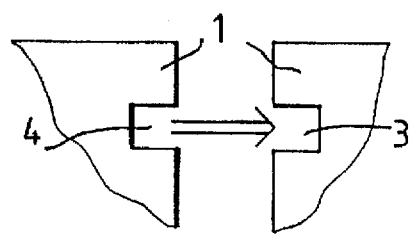
FIG. 1a,b are schematical representations of the direct optical coupling between two modules.
Figure 1B:
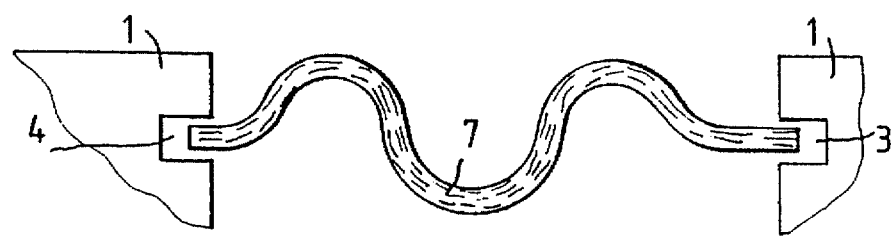

FIG. 1a, b shows the principle of the direct optical network between two display-field modules 1. FIG. 1a shows the direct optical coupling of a transmission device or means 4 of the display-field module 1 with a reception device or means 3 of the adjacent display-field module 1 over a light beam. FIG. 1b shows the possibility of the optical coupling between the two display-field modules 1 over a light- conducting fiber 7. Emitted data signals, e.g. of a L.E.D. as a transmission device 4, are conducted either over the light-conducting fiber 7 or directly to e.g., a photodiode as a reception device 3. In case of the arrangement according to FIG. 1a both display-field modules 1 are optically connected to each other without using any lines or leads. Data/information can be transmitted by light from module to module.

Figure 2:
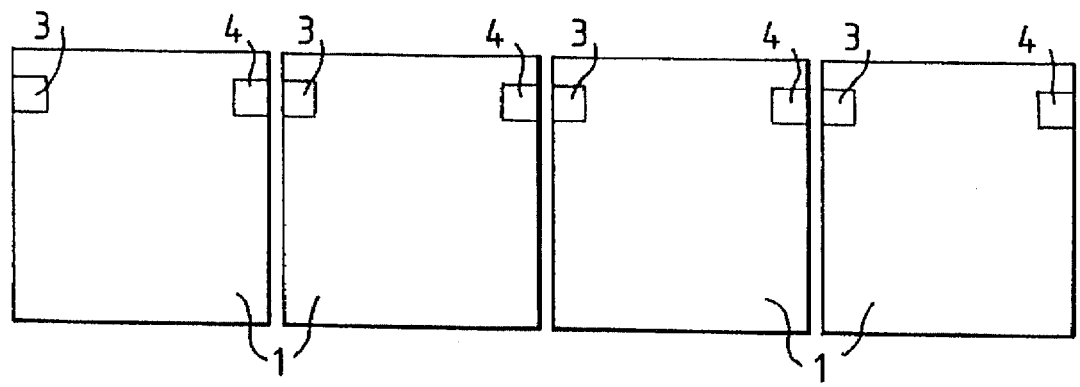
FIG. 2 is a schematical representation of the optical network between display-field modules.

In FIG. 2, a line arrangement of four display-field modules 1 is shown, wherein the respective transmission devices 4 and reception devices 3 are directly optically connected with each other in the form of L.E.D.'s and photodiodes.

Figure 3:
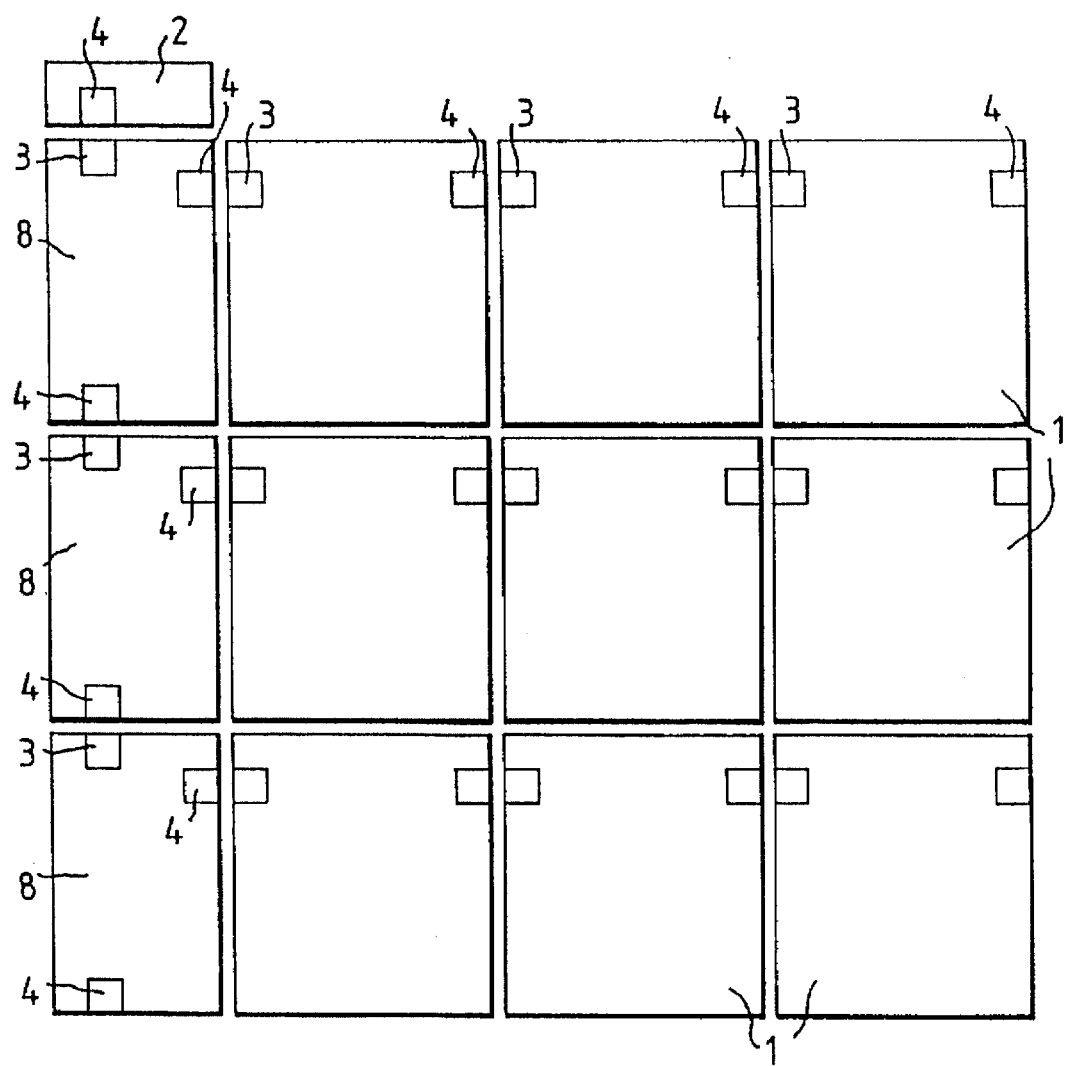
FIG. 3 is a schematical representation of the optical network (direct coupling) of the display-field modules of a display field.

In FIG. 3, the construction of a display field is shown, consisting of nine display-field modules 1 disposed in three rows (lines) and three columns. The individual display-field modules 1 are directly optically coupled with each other over their respective reception devices 3 and transmission devices 4. The transmission devices 4 are formed of L.E.D.'s, the reception devices 3 of photodiodes. Control of the display-field modules 1 is performed from a an initial feeding device 2 for feeding data in. The initial feeding device or means 2 for feeding data in is directly optically coupled with a row feeding device 8 for line (row) coupling-in of the data. Additional devices 8 are associated columnwise to each display-field line, for line coupling-in of the data. The devices 8 are also directly optically coupled with each other in a feeding column. The device 2 for feeding data in includes a transmission device 4 (L.E.D.), optically coupled with reception device 3 of the initial device 8 for line coupling-in of the data. The initial device 8 for line coupling-in of the data includes a transmission device 4 (L.E.D.) for coupling the data into the first display-field module 1 of the first line of the display field. From the first display-field module 1, the data are coupled in, over the described direct optical coupling, into the adjacent display-field module 1, and in the same way from display-field module 1 to display-field module 1. The initial device 8 for line coupling-in includes another transmission device 4 (L.E.D.), which in direct optical contact with a reception device 3 (photodiode) of another device 8 for line coupling-in of the data into the next line of the display-field modules 1. Further devices 8 for line coupling-in of the data are built up in the same way and act in the same way as the described initial device 8.

Figure 4:
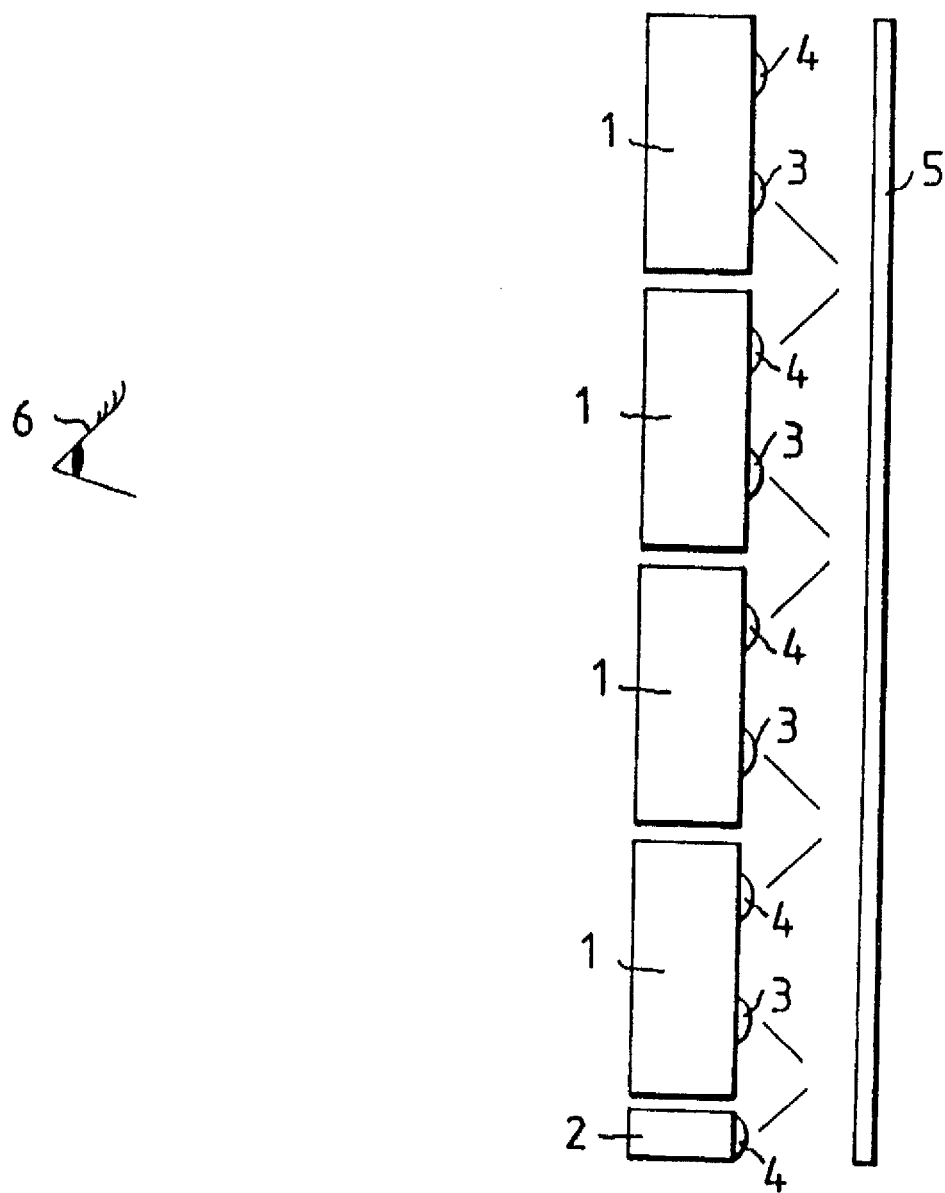
FIG. 4 is a schematical representation of the optical network (indirect coupling) of the display-field modules, in a side view.

FIG. 4 shows the optical network of several display-field modules 1 using indirect coupling. Each display-field module 1 is provided with own transmission and reception devices 4,3 formed of one or more L.E.D's and photodiodes. The data to be displayed on the display field modules is fed in by being optically radiated over the transmission device 4 (L.E.D.) of the device 2 onto a reflection field 5. As shown in FIG. 4, the reflection field is preferably planar and positioned on a side of the display field modules substantially opposite the viewing side. The reflection field preferably extends over the complete back of the display modules. By optical reflection at the reflection field 5, the data will reach the reception device 3 (photodiode) of the display-field module 1. From there, the data are sent, over the adjacent transmission device 4 (L.E.D.) of the adjacent display-field modules to the reflection field 5. The data are reflected at the reflection field 5, and are received and retransmitted transmitted etc. by the next display-field module 1. For a person 6 looking thereunto, an image created on the display field, modules is not affected by the reflection field 5.

Both methods of establishing an optical network of display-field modules, i.e. the direct and indirect methods, can be employed irrespective of the type of display. By avoiding mechanical connection technology and using optical transmission technology only, a multitude of advantages are achieved:

Assembly and maintenance of the display-field modules 1 are simplified, since no cables or mechanical lead connectors have to fitted and loosened later. Material consumption is considerably less by optical networks. Since there are no long data lines, radiation is prevented and irradiation of high-frequency signal portions into the display-field modules is considerably reduced. The optical networks permit high transmission rates in the display-field system.

While specific embodiments of the invention have been shown and described in detail to illustrate the application of the principles of the invention, it will be understood that the invention may be embodied otherwise without departing from such principles.

What is claimed is:

1. A display field arrangement, comprising:
    a plurality of display-field modules arranged in rows and columns, and each displaying a picture, each of said display-field modules including optical transmission and reception means for optically transmitting and receiving display data sequentially along each row via adjacent display modules in said each row in a direction from a first end of said each row to a second end of each row;

a plurality of row feeding devices, each of said plurality of row feeding devices being positioned in a feeding column at said first end of each one of said rows, said each of said row feeding devices including optical transmission and reception means for optically transmitting and receiving display data sequentially along said feeding column of row feeding devices via adjacent row feeding devices in said column in a direction from a first end of said column to a second end of said column, said each of said row feeding devices including another optical transmission means for optically transmitting display data to said optical reception means of a first display-field module of a respective row of said display-field modules;

initial feed means for providing display data, said initial feed means including optical transmission means for optically transmitting display data to said optical reception means of a first row feeding device of said feeding column of said row feeding devices.

2. An arrangement in accordance with claim 1, wherein:

said optical transmission and reception devices of said initial feed means, said plurality of row feeding devices, and said plurality of display-field modules form a one way topology where display data enters a corner of said rows and columns of display-field modules, travels down said column of row feeding devices and branches out into said rows from said column of row feeding devices.

3. An arrangement in accordance with claim 1, wherein:

said optical transmission and reception means of said initial feed means, said plurality of row feeding devices, and said plurality of display-field modules include a reflection field means positioned adjacent a back side of said display-field modules substantially opposite a viewing side of said display-field modules, said reflection field means angularly reflecting optical radiation from each of said optical transmission means to a respective optical reception means.

4. An arrangement in accordance with claim 3, wherein:

said reflection field means is a singular substantially planar surface extending across substantially all of said plurality of row feeding devices and said plurality of display-field modules.

5. An arrangement in accordance with claim 3, wherein:

said optical transmission and reception means of said plurality of display-field modules are positioned on said back side of said display-field modules.

6. An arrangement in accordance with claim 1, wherein:

each of said optical transmission and a respective reception means of said plurality of display-field modules are positioned substantially opposite from and inline with each other, and communicate through a non-solid medium.

7. An arrangement in accordance with claim 1, wherein:

each of said optical transmission and respective reception means of said plurality of display-field modules communicate through a light conducting fiber.

8. An arrangement according to claim 1, wherein:

said optical transmission and reception means are formed by one or more transmission and reception semiconductors;

each of said display-field modules are substantially identical.

9. An arrangement according to claim 8, wherein:

said transmission and reception semiconductors are formed by one or more semiconductor diodes.

10. A method for operating a display field, the method comprising the steps of:

providing a plurality of display-field modules arranged in rows and columns;

providing a plurality of row feeding devices, each of said plurality of row feeding devices being positioned in a feeding column at a first end of each of said rows;

providing an initial feed means positioned at a first end of said feeding column;

optically transmitting display data from said initial feed means to a first of said row feeding devices at said tint end of said feeding column;

optically receiving said display data at said first row feeding device and optically transmitting said display data to an adjacent second row feeding device and to a first display-field module in a respective row;

optically receiving said display data from said first row feeding device at said first display-field module and optically transmitting said display data to an adjacent second display field module in said respective row;

optically receiving said display data from said first row feeding device at said second row feeding device and optically transmitting said display data to a first display-field module in a respective row.

11. A method in accordance with claim 10, wherein:

said second row feeding means optically transmits said display data to an adjacent third row feeding device in said respective row;

said second display-field module optically transmits said display data to an adjacent third display field module in said respective row.

12. A method in accordance with claim 10, wherein:

said optical transmitting is through a non-solid medium.

13. A method in accordance with claim 10, wherein:

said optical transmitting is angular via a reflection field.

14. A method in accordance with claim 13, wherein:

said reflection field is a singular substantially planar surface extending across substantially all of said plurality of row feeding devices and said plurality of display-field modules.

15. A method in accordance with claim 10, wherein:

said optical transmitting is through a light conducting fiber.

16. A method in accordance with claim 10, wherein:

said optical transmitting and receiving is sequentially along said column of row feeding devices, and said rows of said display-field modules.

17. A method in accordance with claim 10, wherein:

said display-field modules display a picture on one side of said display-field module in correspondence with received display data.

18. A method in accordance with claim 10, wherein:

each of said display-field modules display a portion of a picture depending on a position of said each display-field module in said rows and columns.

* * * * *